United States Patent
Akins et al.

(10) Patent No.: US 8,556,505 B2
(45) Date of Patent: Oct. 15, 2013

(54) APPARATUS, SYSTEM, AND METHOD FOR ACCURATELY READING HIGH AND LOW TEMPERATURES

(75) Inventors: Mark Akins, Columbus, IN (US); Elma Avdic, Columbus, IN (US); Matt Bower, North Vernon, IN (US); Bruce Morehead, Greenwood, IN (US)

(73) Assignee: Cummins IP, Inc., Minneapolis, MN (US)

( * ) Notice: Subject to any disclaimer, the term of this patent is extended or adjusted under 35 U.S.C. 154(b) by 349 days.

(21) Appl. No.: 12/885,711

(22) Filed: Sep. 20, 2010

(65) Prior Publication Data
US 2011/0090938 A1    Apr. 21, 2011

Related U.S. Application Data
(60) Provisional application No. 61/243,886, filed on Sep. 18, 2009.

(51) Int. Cl.
*G01K 7/00* (2006.01)
*G01K 1/00* (2006.01)
*G01K 15/00* (2006.01)

(52) U.S. Cl.
USPC ............... 374/183; 374/185; 374/144; 374/1

(58) Field of Classification Search
USPC ...................... 374/183, 185, 144, 1
See application file for complete search history.

(56) References Cited

U.S. PATENT DOCUMENTS

| | | | | |
|---|---|---|---|---|
| 3,500,074 A | * | 3/1970 | Obenhaus | 307/117 |
| 4,215,336 A | | 7/1980 | Smith | |
| 4,363,556 A | * | 12/1982 | Belliveau et al. | 374/183 |
| 4,526,481 A | * | 7/1985 | Hansen | 374/144 |
| 4,574,200 A | * | 3/1986 | Racca et al. | 307/117 |
| 4,576,487 A | * | 3/1986 | Conover et al. | 374/183 |
| 4,721,363 A | * | 1/1988 | Inoue | 345/101 |
| 4,951,632 A | * | 8/1990 | Yakuwa et al. | 123/688 |
| 5,317,520 A | * | 5/1994 | Castle | 702/58 |
| 5,453,682 A | | 9/1995 | Hinrichs et al. | |
| 5,628,199 A | | 5/1997 | Hoglund et al. | |
| 5,655,841 A | * | 8/1997 | Storm | 374/183 |
| 5,881,451 A | | 3/1999 | Kneezel et al. | |
| 6,083,369 A | * | 7/2000 | Tanigawa | 204/424 |
| 6,191,536 B1 | * | 2/2001 | Dolmovich | 315/209 CD |
| 6,332,710 B1 | * | 12/2001 | Aslan et al. | 374/183 |
| 6,554,469 B1 | * | 4/2003 | Thomson et al. | 374/178 |
| 6,889,152 B2 | | 5/2005 | More | |
| 6,957,910 B1 | * | 10/2005 | Wan et al. | 374/183 |

(Continued)

FOREIGN PATENT DOCUMENTS
EP        1775274 A1     4/2007
WO    2006135977 A1    12/2006

*Primary Examiner* — Mirellys Jagan
(74) *Attorney, Agent, or Firm* — Kunzler Law Group, PC

(57) ABSTRACT

According to one embodiment, an apparatus for reading a temperature of a material includes a thermistor that is communicable in temperature sensing communication with the material. The apparatus also includes a first resistor that has a first resistance and a second resistor that has a second resistance that is lower than the first resistance. Additionally, the apparatus includes a switch that is selectively controllable to electrically couple the first resistor and second resistor to the thermistor in a low temperature mode. The switch also is selectively controllable to electrically couple the second resistor to the thermistor and electrically decouple the first resistor from the thermistor in a high temperature mode.

10 Claims, 3 Drawing Sheets

(56) References Cited

U.S. PATENT DOCUMENTS

| | | |
|---|---|---|
| 7,056,453 B2 | 6/2006 | Ogata et al. |
| 7,252,432 B1 * | 8/2007 | Henderson et al. ........... 374/183 |
| 7,896,545 B2 * | 3/2011 | Pan ............................... 374/178 |
| 2007/0046419 A1 * | 3/2007 | Inagaki et al. .................. 338/13 |
| 2009/0016409 A1 * | 1/2009 | Mizoguchi et al. ........... 374/185 |
| 2009/0063070 A1 * | 3/2009 | Renneberg ..................... 702/66 |

* cited by examiner

APPARATUS, SYSTEM, AND METHOD FOR ACCURATELY READING HIGH AND LOW TEMPERATURES

CROSS-REFERENCE TO RELATED APPLICATION

This application claims the benefit of U.S. Provisional Patent Application No. 61/243,886, filed Sep. 18, 2009, which is incorporated herein by reference.

FIELD

This disclosure relates to internal combustion engine systems, and more particularly to monitoring the temperature of exhaust gas generated by internal combustion engines.

BACKGROUND

Internal combustion engine systems typically include exhaust gas after-treatment systems that receive and treat exhaust gas from an internal combustion engine. Exhaust gas after-treatment systems can include one or more exhaust gas treating elements, such as diesel oxidation catalysts, particulate matter filters, selective catalytic reduction systems, $NO_x$ adsorption catalysts, and ammonia oxidation catalysts. Commonly, the operation of such exhaust gas treatment elements depends on the temperature of the exhaust gas passing through the exhaust gas after-treatment system, and, more particularly, through the respective exhaust gas treating elements. Accordingly, exhaust gas after-treatment systems include temperature sensing devices, such as thermistors, to sense the temperature of the exhaust gas at one or more locations within the exhaust gas after-treatment systems.

For reading temperatures sensed by a thermistor, the thermistor is typically coupled with a voltage divider circuit that has a single interface or pull-up resistor with a constant resistance. Conventionally, the resistance value of the interface resistor is matched with the thermistor to provide accurate temperature readings for temperatures within a predefined temperature range. The predefined temperature range generally is associated with a predetermined operating range of the engine. For some diesel engines, the predefined temperature range can be between 200° C. and 650° C.

Problems associated with reading exhaust temperatures and diagnosing thermistor conditions may arise for exhaust gas temperatures that exceed the predefined temperature range or when out-of-range events occur. Although thermistors are capable of sensing exhaust temperatures outside of the predetermined temperature range, such as between 650° C. and 1,000° C., and between −40° C. and 200° C., thermistor interface circuits with a single pull-up resistor fail to provide accurate temperature readings and diagnostics within such extreme temperature ranges. For example, a thermistor interface circuit with a single pull-up resistor cannot discern between cold ambient conditions and an out-of-range condition, which could be the result of a defective thermistor.

To alleviate such shortcomings associated with thermistor interface circuits that have a single pull-up resistor, diagnostic testing of the thermistor typically is conducted during only those engine operating conditions when the exhaust gas is expected to be running within the predetermined temperature range. However, this approach introduces additional limitations, such as the unavailability of accurate diagnostic testing of the thermistor during certain operating conditions of the engine. For example, in cold weather environments, the temperature of exhaust gas may remain below the predetermined temperature range for prolonged periods of time. On Board Diagnostics (OBD) and other regulations may require that all temperature sensors work accurately, or defective sensors are quickly detected, through the entire potential operating range of an engine (e.g., exhaust temperatures between −40° C. and 1,000° C.). Accordingly, proper diagnosis of a defective thermistor may be unacceptably delayed when using a thermistor interface circuit with a single pull-up resistor.

SUMMARY

The subject matter of the present application has been developed in response to the limitations of the present state of the art concerning temperature detection and temperature sensing device failure detection. Accordingly, the subject matter of the present application has been developed to provide an apparatus, a system, and a method that overcomes at least some of the shortcomings of the present state of the art.

According to one embodiment, an apparatus for reading a temperature of a material includes a thermistor that is communicable in temperature sensing communication with the material. In certain implementations, the thermistor has a variable resistance that varies based on the temperature of the material. The apparatus also includes a first resistor that has a first resistance and a second resistor that has a second resistance that is lower than the first resistance. Additionally, the apparatus includes a switch that is selectively controllable to electrically couple the first resistor and second resistor to the thermistor in a low temperature mode. The switch also is selectively controllable to electrically couple the second resistor to the thermistor and electrically decouple the first resistor from the thermistor in a high temperature mode.

In certain implementations, the switch is operable in one of the low and high temperature modes based on a predicted temperature of the material. The material can be exhaust gas generated by an internal combustion engine. Further, the predicted temperature of the exhaust gas can be based on an operating condition of the internal combustion engine. In some implementations, the predicted temperature of the exhaust gas is based on a temperature of ambient air within which the internal combustion engine is operating.

According to some implementations, in the low temperature mode, temperatures sensed by the thermistor within a lower temperature range are accurate and temperatures sensed by the thermistor within an upper temperature range higher than the lower temperature range are inaccurate. In contrast, in the high temperature mode, temperatures sensed by the thermistor within the lower temperature range are inaccurate and temperatures sensed by the thermistor within the upper temperature range are accurate. The combined lower and upper temperature ranges can include the maximum temperature range of the material.

In another embodiment, an electrical circuit includes a thermistor that is communicable in temperature sensing communication with exhaust gas, as well as a voltage supply that is communicable in voltage supplying communication with the thermistor. The electrical circuit also includes a high-resistance resistor between the thermistor and the voltage supply, as well as a low-resistance resistor between the high-resistance resistor and the thermistor. Additionally, the electrical circuit includes a switch with a bypass line bypassing the high-resistance resistor. The switch is actuatable to direct current from the voltage supply through the high-resistance resistor and low-resistance resistor for exhaust gas temperatures within a low temperature range and to direct current from the voltage supply around the high-resistance resistor via the bypass line for exhaust gas temperatures within a high temperature range.

According to some implementations, the electrical circuit includes an analog-to-digital converter that converts a voltage divider output signal representative of a temperature of the exhaust gas. The voltage divider output signal can be defined as a difference between a reference voltage and at least a voltage lost due to a combined resistance of the thermistor, high-resistance resistor, and low-resistance resistor in the low temperature mode. In contrast, the voltage divider output signal is a difference between the reference voltage and at least a voltage lost due to a combined resistance of the thermistor and low-resistance resistor in the high temperature mode. At least a portion of the voltage divider output signals for exhaust gas temperatures within the low temperature range can be the same as at least a portion of the voltage divider output signals for exhaust gas temperatures within the high temperature range.

In certain implementations, the electrical circuit includes an electronic control module that is configured to predict an exhaust gas temperature. The electronic control module can be operable to control the actuation of the switch based on the predicted exhaust gas temperature. The electrical circuit may also include an on-board diagnostics controller that is communicable in electronic communication with the electronic control module. The on-board diagnostics controller triggers a thermistor diagnostic fault for voltage divider output signal values within a predetermined voltage divider output signal value upper and lower range. According to some implementations, the voltage divider output signal value associated with a lowest temperature of the low temperature range can be substantially higher than a highest voltage divider output signal value of the voltage divider output signal value lower range. The voltage divider output signal value associated with a highest temperature of the high temperature range can be substantially lower than a lowest voltage divider output signal value of the voltage divider output signal value upper range.

According to yet another embodiment, a method for reading a temperature of an exhaust gas includes providing a multi-mode thermistor interface circuit selectively operable in one of at least low and high temperature modes. The method also includes detecting a voltage differential across a first circuit of the thermistor interface circuit comprising a thermistor, a high-resistance pull-up resistor, and a low-resistance pull-up resistor in the low temperature mode. Additionally, the method includes detecting a voltage differential across a second circuit of the thermistor interface circuit comprising the thermistor, the low-resistance pull-up resistor, and a bypass line bypassing the high-resistance pull-up resistor in the high temperature mode. The method further includes generating a reading of the temperature of the exhaust gas based on one of the detected voltage differentials across the first and second circuits.

In some implementations, the method includes predicting a temperature of the exhaust gas. In the method, operation of the thermistor interface circuit in one of the at least low and high temperature modes can be selected based on the predicted temperature of the exhaust gas. The thermistor can be selectively operated in the low temperature mode if the predicted temperature of the exhaust gas falls within a predetermined low temperature range. In contrast, the thermistor can be selectively operated in the high temperature mode if the predicted temperature of the exhaust gas falls within a predetermined high temperature range.

According to certain implementations, the method includes triggering a diagnostic fault if one of the detected voltage differentials across the first and second circuits falls is higher than an upper threshold or lower than a lower threshold. Also, the method can include converting the detected voltage differentials to actual temperature readings only for voltage differential values falling within a predetermined voltage differential value range. At least a portion of the voltage differential values across the first circuit in the low temperature mode can be the same as at least a portion of the voltage differential values across the second circuit in the high temperature mode. In some implementations, the m method includes one of opening and closing a switch to convert the first circuit into the second circuit, and the other of opening and closing the switch to convert the second circuit into the first circuit.

Reference throughout this specification to features, advantages, or similar language does not imply that all of the features and advantages that may be realized with the subject matter of the present application should be or are in any single embodiment or implementation of the subject matter. Rather, language referring to the features and advantages is understood to mean that a specific feature, advantage, or characteristic described in connection with an embodiment is included in at least one embodiment of the subject matter of the present application. Discussion of the features and advantages, and similar language, throughout this specification may, but do not necessarily, refer to the same embodiment or implementation.

The described features, advantages, and characteristics of the subject matter of the present application may be combined in any suitable manner in one or more embodiments and/or implementations. One skilled in the relevant art will recognize that the present subject matter may be practiced without one or more of the specific features or advantages of a particular embodiment or implementation. In other instances, additional features and advantages may be recognized in certain embodiments and/or implementations that may not be present in all embodiments or implementations. These features and advantages of the subject matter of the present application will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

In the following description, numerous specific details are provided to impart a thorough understanding of embodiments of the subject matter of the present application. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the subject matter of the present application.

Figure 1:
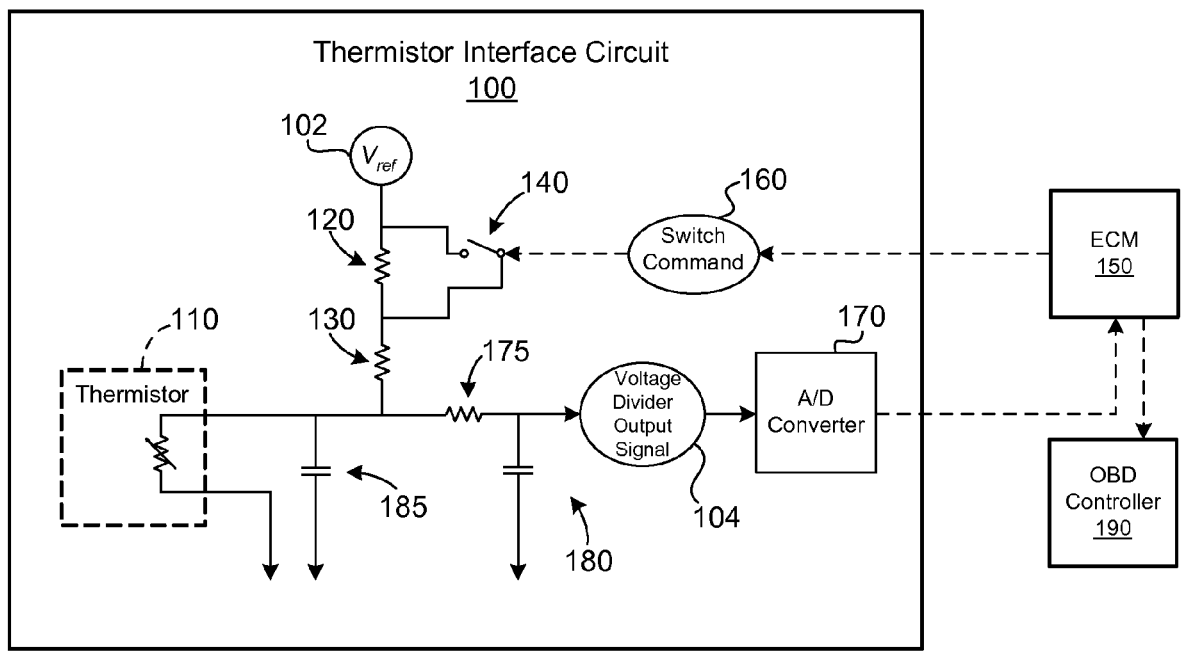
FIG. 1 is a schematic rendering of a temperature monitoring system with a thermistor interface circuit according to one embodiment.

Referring to FIG. 1, according to one embodiment, a temperature monitoring system 10 includes a thermistor interface circuit 100 that overcomes at least one of the shortcomings of conventional thermistor interface circuits. The temperature monitoring system 10 also includes an engine control module (ECM) 150 and an on-board diagnostic (OBD) controller 190.

The thermistor interface circuit 100 includes a thermistor 110 and two pull-up resistors 120, 130. The thermistor 110 is positioned at least partially within an exhaust gas stream to sense a temperature of the exhaust gas. The thermistor 110 can be any of various temperature sensing devices configured to vary an electrical resistance value through the device in accordance with the temperature of the exhaust gas. In other words, a resistance value of the thermistor 110 either increases or decreases with changing exhaust temperature based on the temperature coefficient of resistance of the thermistor. For example, in certain implementations, the thermistor 110 has a positive temperature coefficient of resistance such that the resistance of the thermistor increases and decreases with an increase and a decrease, respectively, in the exhaust gas temperature. In other implementations, the thermistor 110 has a positive temperature coefficient of resistance such that the resistance of the thermistor increases and decreases with a decrease and an increase, respectively, in the exhaust gas temperature. Although the thermistor interface circuit 100 can be configured and calibrated to work with either a positive or negative temperature coefficient thermistor, the disclosure will proceed according to a thermistor interface circuit with a positive temperature coefficient thermistor. The configuration and calibration of the thermistor interface circuit to work with a negative temperature coefficient thermistor can be determined by one of ordinary skill in the art without undue experimentation in view of this disclosure.

In the illustrated embodiment with a positive temperature coefficient thermistor, the resistor 120 has a constant resistance value higher than a constant resistance value of the resistor 130. The pull-up resistors 120, 130 are electrically coupleable with a reference voltage ($V_{ref}$) source 102. A switch 140 controls the path of the current produced by the reference voltage source 102 through either both the high and low pull-up resistors 120, 130 or just the low pull-up resistor. The switch 140 is operatively controlled by the ECM 150 (or other controller) to operate the thermistor interface circuit 100 in one of a low temperature mode and high temperature mode. More specifically, the ECM 150 generates a switch command 160 to either open the switch 140 to create an open circuit or close the switch 140 to create a closed circuit. For operation in the low temperature mode, the switch command 160 opens the switch 140 such that the current passes through both the high and low pull-up resistors 120, 130 (i.e., the pull-up resistor value for the circuit 100 is equal to the combined resistances of the high and low pull-up resistors). In contrast, for operation in the high temperature mode, the switch command 160 closes the switch 140 such that current bypasses the high pull-up resistor 120 (i.e., the pull-up resistor value for the circuit 100 is equal to the resistance of the low pull-up resistor 130).

The thermistor interface circuit 100 is configured as a voltage divider circuit to provide a voltage divider output signal 104 to an analog-to-digital (A/D) converter 170. The value of the voltage divider output signal 104 represents the difference between the reference voltage source 102 and the voltage lost due to resistance in the circuit between the reference voltage and the A/D converter 170. In other words, the voltage divider output signal 104 represents the voltage differential across the one or more pull-up resistors and the thermistor. Accordingly, the higher the resistance of the circuit 100, the lower the value of the voltage divider output signal 104, and the lower the transfer function of the circuit 100. The resistance in the circuit 100 includes the pull-up resistors 120, 130 each with a constant resistance and the thermistor 110 with a variable resistance that varies according to the temperature of exhaust gas as discussed above. The circuit 100 may also include a low pass filter resistor 175, low-pass filter capacitor 180, and radio frequency filter capacitor 185 to amplify and/or filter the voltage divider output signal 104.

The A/D converter 170 converts the voltage divider output signal 104 from an analog signal to a digital signal, and transmits the digital signal to the ECM 150 as shown. The ECM 150 converts the digital voltage divider output signal 104 into a temperature value via a predetermined look-up table. In certain implementations, the ECM 150 may transmit the determined temperature value to an on-board diagnostics (OBD) controller 190 for diagnostics testing. The OBD controller 190 may be separate from or form part of the ECM 150. In yet the same or other implementations, the ECM 150, or a separate exhaust gas after-treatment controller, may utilize the determined temperature value to control the operation of an exhaust gas after-treatment system, such as, for example, particulate matter filter regeneration events, reactant injection events, and reductant injection events.

In operation, the ECM 150 switches operation of the thermistor interface circuit 100 between the low temperature mode and high temperature mode based on operating conditions of the engine and/or environmental conditions. For example, if the engine is operating within a predetermined low temperature operating range, a predicted exhaust temperature is within a low range, or the ambient air temperature is below a threshold value, the ECM 150 commands the switch 140 via the switch command 160 to open such that the current from the reference voltage passes through both the high and low pull-up resistors 120, 130. Because the current passes through both resistors 120, 130, the overall resistance of the circuit 100 is increased, which allows the circuit to more accurately read lower exhaust temperatures. If, however, the engine is operating within a predetermined high temperature operating range, a predicted exhaust temperature is within a high range, or the ambient air temperature is above a threshold value, the ECM 150 commands the switch 140 via the switch command 160 to close such that current from the reference voltage bypasses the high resistor 120 via the switch and passes through the low resistor 130. Because the current passes through only the low resistor 130 and not the high resistor 120 in the high temperature mode, the overall resistance of the circuit 100 is decreased, which allows the circuit to more accurately read higher exhaust gas temperatures. In this manner, accurate exhaust gas temperature readings at extreme low and extreme high exhaust gas temperatures, as well as accurate diagnostic tests of the thermistor at all times and during all operating ranges of the engine, can be achieved.

Figure 2:
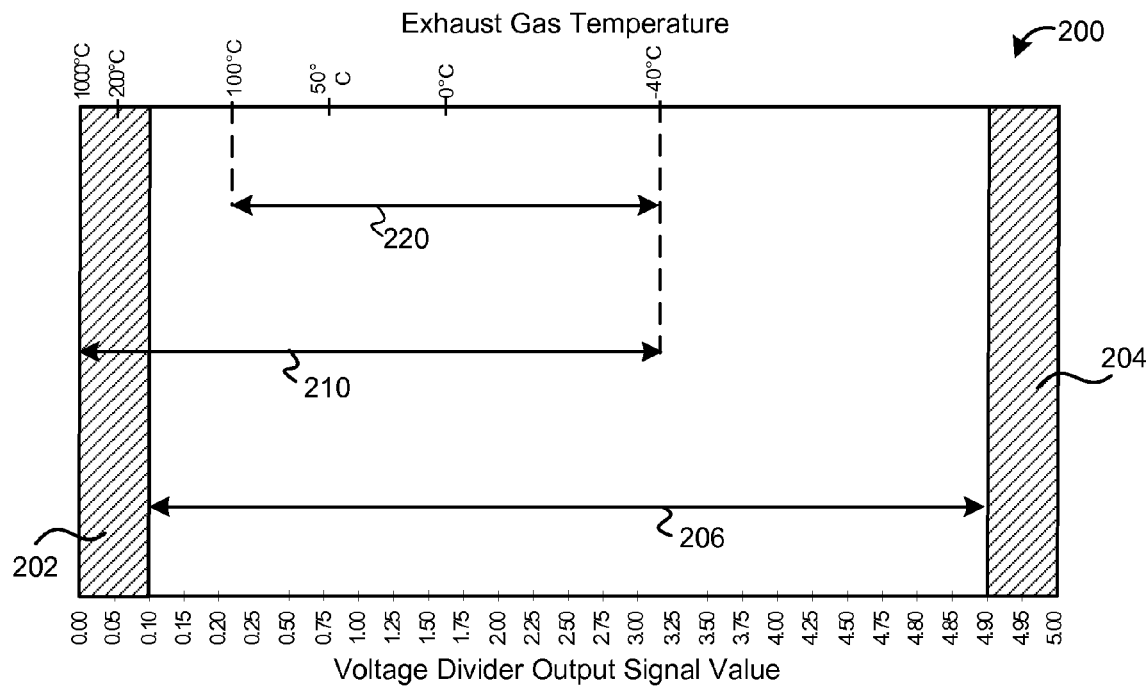
FIG. 2 is a chart comparing voltage divider output signal values to exhaust gas temperature values for operation of a thermistor interface circuit in a low temperature mode according to one embodiment.
Figure 3:
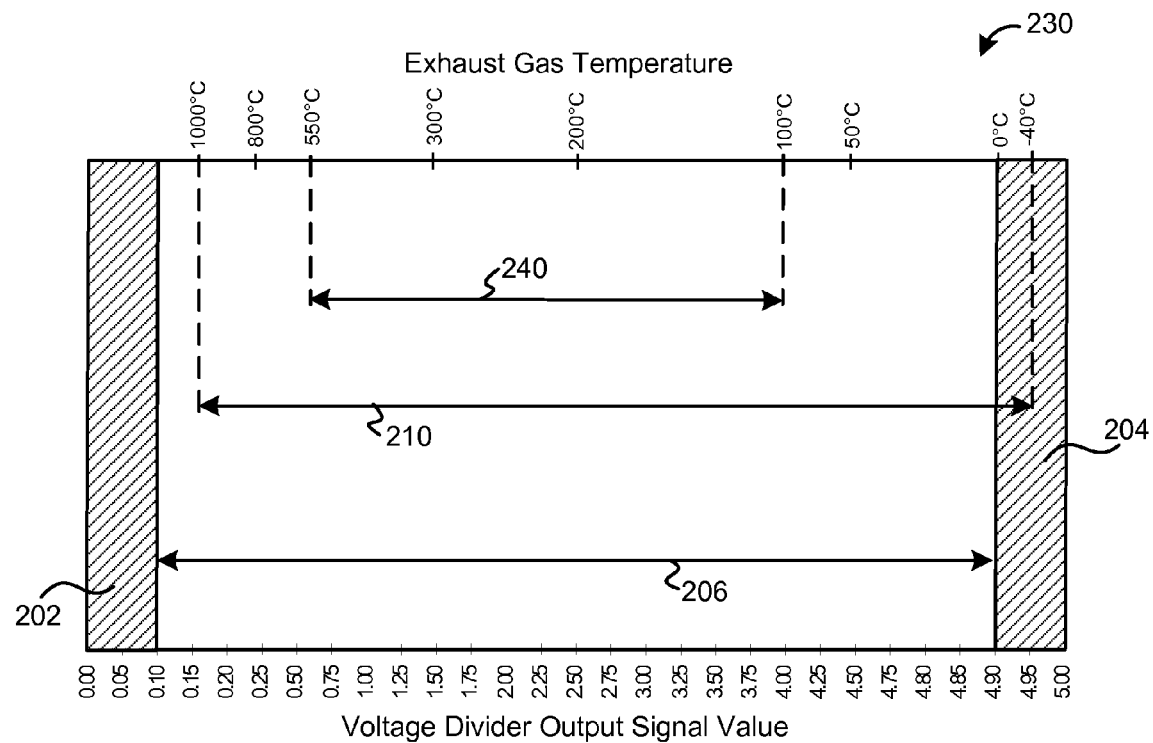
FIG. 3 is a chart comparing voltage divider output signal values to exhaust gas temperature values for operation of a thermistor interface circuit in a high temperature mode according to one embodiment.
Figure 4:
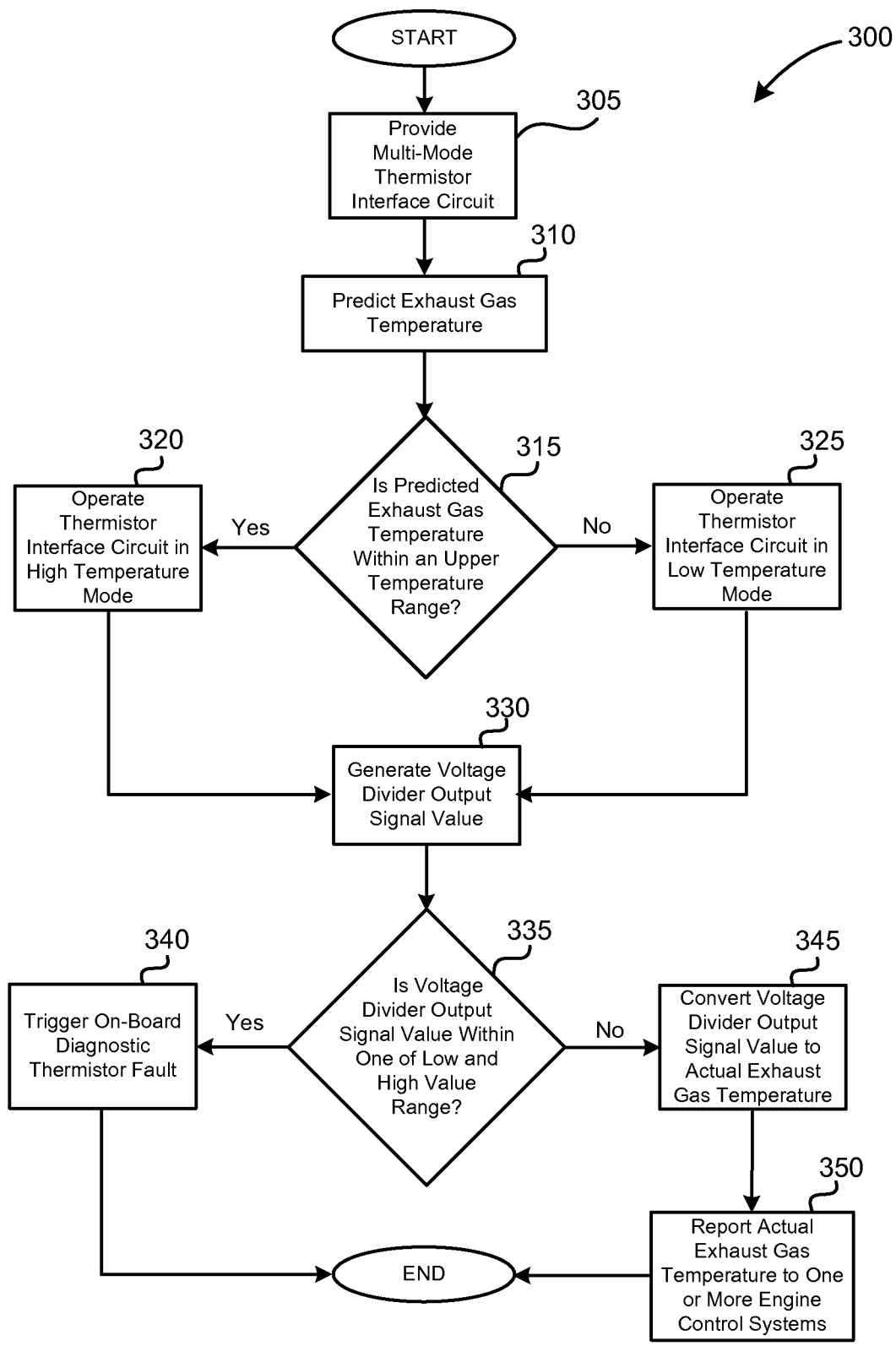
FIG. 4 is a flow chart diagram illustrating a method for monitoring a temperature of exhaust gas according to one embodiment.

According to one embodiment, the range of voltage divider output signals 104 for which accurate readings of exhaust gas temperature and accurate diagnostic tests are achievable with the thermistor interface circuit 100 is shown in the graphs 200, 230 of FIGS. 2 and 3, respectively. The A/D converter 170 is capable of receiving and processing all voltage divider output signal values within a predetermined range depending on the capacity and configuration of the A/D converter. As an example, in the illustrated embodiment, the A/D converter 170 has a voltage divider output signal value range between 0.00 and 5.00 as represented in FIGS. 2 and 3. In other embodiments, the range can be between any of various values based on the A/D converter.

The thermistor 110 is capable of detecting exhaust gas temperatures within a predetermined range depending on the capacity and configuration of the thermistor. As an example, in the illustrated embodiment, the thermistor 110 has an exhaust gas temperature detection range 210 between −40° C. and 1000° C. In other words, independent of the configuration of the thermistor interface circuit 100, the thermistor 110 is physically capable of detecting exhaust gas temperatures between −40° C. and 1000° C.

Notwithstanding the exhaust gas temperature detection range 210, the ability of the thermistor interface circuit 100 to accurately detect exhaust gas temperatures is dependent on whether the voltage divider output signal value 104 produced by the circuit falls within a predetermined accuracy range 206. In other words, the accuracy of an exhaust gas temperature reading as generated by the thermistor interface circuit 100 is considered accurate if the voltage divider output signal value 104 falls within the predetermined accuracy range 206. The predetermined accuracy range 206 is defined as the range of voltage divider output signal values 104 between a predetermined low value range 202 and a predetermined high value range 204. The predetermined low and high value ranges 202 includes voltage divider output signal values 104 for which accurate exhaust gas temperature readings and proper diagnostic testing of the thermistor 110 may not be achievable.

As discussed above, the thermistor interface circuit 100 is operable in a low and high temperature mode depending on a predicted or estimated temperature of the exhaust gas. The graph 200 of FIG. 2 represents operation of the thermistor interface circuit 100 in the low temperature mode and the graph 230 of FIG. 3 represents operation of the thermistor interface circuit in the high temperature mode. Referring to FIG. 2, in the low temperature mode, the relatively high pull-up resistance of the circuit 100, which is due to the combination (e.g., summation) of the high resistor 120 and low resistor 130, allows the circuit 100 to provide accurate temperature readings for exhaust gas temperatures within a predetermined lower temperature range 220. In the illustrated embodiment, the predetermined lower temperature range 220 includes temperatures between and including −40° C. and 100° C., which fall within the exhaust gas temperature detection range 210 of the thermistor 110. The temperature readings provided during operation in the low temperature mode are considered accurate because the corresponding voltage divider output signal values 104 generated by the circuit 100 for each of the temperature readings within the predetermined lower temperature range 220 are within the predetermined accuracy range 206.

As shown in the graph 200, should exhaust gas temperatures rise above 100° C. (200° C. or higher) during operation of the thermistor interface circuit 100 during the low temperature mode, the associated voltage divider output signal values 104 would be driven into the predetermined low value range 202 corresponding to inaccurate readings and an inability to properly diagnostically test the thermistor 110. Accordingly, for exhaust gas temperatures higher than the upper limit of the predetermined lower temperature range 220, the electronic control module 150 can switch operation of the thermistor interface circuit from the low temperature mode to the high temperature mode. Referring to FIG. 3, in the high temperature mode, the relatively low pull-up resistance of the circuit 100, which is due to the low resistor 130 providing the sole pull-up resistance for the circuit, allows the circuit to provide accurate temperature readings for exhaust gas temperatures within a predetermined upper temperature range 240 higher than the predetermined lower temperature range 220. In the illustrated embodiment, the predetermined higher temperature range 240 includes temperatures between and including 100° C. and 550° C., which fall within the exhaust gas temperature detection range 210 of the thermistor 110. As with operation in the low temperature mode, the temperature readings provided during operation in the high temperature mode are considered accurate because the corresponding voltage divider output signal values 104 generated by the circuit 100 for each of the temperature readings within the predetermined lower temperature range 240 are within the predetermined accuracy range 206.

Based on the foregoing, the dual-mode temperature monitoring system 10 is configured to provide accurate exhaust gas temperature readings and diagnostic testing within a broader range of exhaust gas temperatures (e.g., across the entire or maximum operating range of the engine) compared to single-mode systems. In other words, providing a thermistor interface circuit 100 that is switchable between low and high temperature modes as described herein allows accurate temperature readings even for unexpected exhaust gas temperatures and allows accurate detection of defective thermistors.

As discussed above, thermistors commonly are considered defective when the voltage divider output signal value falls within one of the predetermined low and high value ranges 202, 204. However, as shown in FIGS. 2 and 3, the voltage divider output signal values 104 corresponding with the extreme ends of the exhaust gas temperature detection range 210 can fall within the predetermined low and high value ranges 202, 204. Therefore, for conventional systems, running a thermistor diagnostic test while the exhaust gas temperature is within such extreme ends of the range 210 would result in a false positive, i.e., the thermistor appears defective, but actually is functioning properly. The dual-mode operation of the thermistor interface circuit 100 reduces the likelihood of false positives by moving the voltage divider output signal values 104 associated with the extreme ends of the exhaust gas temperature range away from the low and high value ranges 202, 204 for all operating conditions of an engine. In other words, because the circuit 100 is configured to effectively prevent the generation of voltage divider output signal values 104 within the low and high value ranges 202, 204 with a properly functioning thermistor during all operating conditions of the engine, a generated voltage divider output falling within one of the low and high value ranges can be confidently attributed to a defective thermistor.

Although the embodiments of the thermistor interface circuit described above operate in one of a low and high temperature mode, in other embodiments, the thermistor interface circuit is operable in one of three or more temperature modes. For example, in certain implementations, the thermistor interface circuit can include more than two pull-up resistors and more than two switches. In these implementations, the switches are selectively controllable by the ECM 150 to direct a current through alternative current paths each associated with a different pull-up resistor combination and pull-up resistance value. In one specific implementation, the thermistor interface circuit can be operable in one of a low, medium, and high temperature mode. In the low temperature mode, current can be directed through a high-resistance resistor by bypassing one or both of a medium and low-resistance resistor via the opening and/or closing of switches. In the medium temperature mode, one or more of the switches can be actuated to direct current through the medium resistance resistor and bypass the high and/or low-resistance resistor. Finally, in the low temperature mode, current can be directed through only the low-resistance resistor by bypassing the high and medium resistance resistor.

Operation in the low, medium, and high temperature mode can provide accurate temperature readings and diagnostic testing for respective low, medium, and high temperature ranges in a manner similar to that describe above. However, in some implementations, utilizing multiple operating modes associated with multiple temperature ranges provides even more precise control over the accuracy of temperature readings and diagnostic testing. In view of this disclosure, the thermistor interface circuit can include any of various pull-up resistors and switches, and be operable in any of various operating modes as desired without departing from the essence of the disclosure.

According to one embodiment, a method 300 for detecting the temperature of a material, such as exhaust gas, includes providing a multi-mode thermistor interface circuit at 305. The multi-mode thermistor interface circuit can be the multi-mode thermistor interface circuit 100 described herein. The method 300 also includes predicting an exhaust gas temperature at 310. The exhaust gas temperature can be predicted using any of various methods known in the art, such as feedforward methods utilizing predetermined look-up tables. In some implementations, the predetermined look-up tables can provide a comparison between predetermined exhaust gas values and associated engine operating conditions, such as engine speed, ambient air temperature, engine load, exhaust after-treatment regeneration events, and the like.

At 315, the method 300 determines whether the predicted exhaust gas temperature is within an upper temperature range (i.e., not within a lower temperature range). The upper and lower temperature ranges can be based on the pull-up resistor configuration of the provided thermistor interface circuit as discussed above. If the predicted exhaust gas temperature is within the upper temperature range, the method 300 includes operating the thermistor interface circuit in a high temperature mode at 320. However, if the predicted exhaust gas temperature is not within the upper temperature range (i.e., is within the lower temperature range), the method 300 includes operating the thermistor interface circuit in a low temperature mode at 325. In certain implementations, operation of the thermistor interface circuit in the high temperature mode includes bypassing a high-resistance pull-up resistor such that the overall pull-up resistance of the circuit is relatively low. The high-resistance pull-up resistor can be bypassed by closing a loop of the thermistor interface circuit. In contrast, operation of the thermistor interface circuit in the low temperature mode includes combining the high-resistance pull-up resistor with a low-resistance pull-up resistor such that the overall pull-up resistance of the circuit is relatively high. The high-resistance and low-resistance pull-up resistors can be combined by opening the loop of the thermistor interface circuit.

Whether operating in the high or low temperature mode, the thermistor interface circuit generates a voltage divider output signal value at 330. At 335, the method 300 determines if the generated voltage divider output signal is within one of low and high value ranges. The low and high value ranges are associated with predetermined low and high out-of-range value ranges, respectively. In other words, generated voltage divider output signal values that fall within one of the low and high value ranges indicate a defective thermistor. Accordingly, the method 300 triggers an on-board diagnostic or other system thermistor fault at 340 if the generated voltage divider output signal value is within one of the low and high value ranges. In certain implementations, the low and high value ranges are the same for operation of the thermistor interface circuit in both the high and low temperature modes.

If, at 335, it is determined that the generated voltage divider output signal value is outside of the low and high value ranges, the method 300 proceeds to convert the voltage divider output signal value to an actual exhaust gas temperature. The actual exhaust gas temperature is then reported to one or more engine control systems at 350. In certain implementations, the actual exhaust gas temperature is reported to an exhaust gas after-treatment system for exhaust treatment operations, such as particulate filter regeneration and reductant dosing. In yet some implementations, the actual exhaust gas temperature is reported to the engine control modules for operation of the engine itself. Following the reporting of the actual exhaust gas temperature, the method 300 ends.

The resistance values for the high and low resistors 120, 130 can be any of various combinations as desired. In certain implementations, the resistance values are selected based on the configuration of the engine, as well as the environment and the predicted use of the engine. In one implementation, the resistance of the high resistor 120 is selected to provide accurate temperature readings and thermistor diagnostics within a predetermined lower exhaust temperature range (e.g., range 220) defined between a lowest possible exhaust gas temperature (e.g., −40° C.) and a desired mid-range temperature (e.g., 100° C.). Similarly, the resistance of the low resistor 130 is selected to provide accurate temperature readings and thermistor diagnostics within a predetermined higher exhaust temperature range (e.g., range 240) defined between a highest possible exhaust gas temperature (e.g., 550° C.) and the desired mid-range temperature (e.g., 100° C.). The resistance values for the high and low resistors 120, 130 also are selected to maintain the voltage divider output signal values 104, which are associated with temperatures between the extreme high and low exhaust gas temperatures, outside of the low and high value ranges 202, 204 (e.g., below an upper threshold and above a lower threshold).

Because the dual pull-up thermistor interface circuit 100 accurately reads exhaust temperatures across the entire system exhaust temperature range, other system rationality information and/or delayed diagnostic testing are not necessary for achieving accurate temperature readings and diagnostic testing results. Although the above embodiments have been described in relation to exhaust gas temperatures in an exhaust after-treatment system, the present invention can be used to accurately read temperatures of other materials within other systems without departing from the essence of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for reading a temperature of a material, comprising:
    a thermistor communicable in temperature sensing communication with the material;
    a first resistor having a first resistance;
    a second resistor having a second resistance lower than the first resistance;
    a switch selectively controllable to electrically couple the first resistor and second resistor to the thermistor in a low temperature mode, and to electrically couple the second resistor to the thermistor and electrically decouple the first resistor from the thermistor in a high temperature mode; and
    an engine control module that determines a voltage differential value across the first resistor, second resistor, and thermistor in the low temperature mode and determines a voltage differential value across the second resistor and thermistor in the high temperature mode, wherein the engine control module triggers a thermistor diagnostic fault for voltage differential values within predetermined voltage differential value upper and lower ranges.

2. The apparatus of claim 1, wherein in the thermistor comprises a variable resistance that varies based on a temperature of the material.

3. The apparatus of claim 1, wherein in the low temperature mode, temperatures sensed by the thermistor within a lower temperature range are accurate and temperatures sensed by the thermistor within an upper temperature range higher than the lower temperature range are inaccurate, and wherein in the high temperature mode, temperatures sensed by the thermistor within the lower temperature range are inaccurate and temperatures sensed by the thermistor within the upper temperature range are accurate.

4. The apparatus of claim 3, wherein the combined lower and upper temperature ranges comprises the maximum temperature range of the material.

5. The apparatus of claim 1, wherein the switch is operable in one of the low and high temperature modes based on a predicted temperature of the material.

6. The apparatus of claim 5, wherein the material comprises exhaust gas generated by an internal combustion engine, and wherein the predicted temperature of the exhaust gas is based on an operating condition of the internal combustion engine.

7. The apparatus of claim 5, wherein the material comprises exhaust gas generated by an internal combustion engine, and wherein the predicted temperature of the exhaust gas is based on a temperature of ambient air within which the internal combustion engine is operating.

8. An electrical circuit, comprising:
    a thermistor communicable in temperature sensing communication with exhaust gas;
    a voltage supply communicable in voltage supplying communication with the thermistor;
    a high-resistance resistor between the thermistor and the voltage supply;
    a low-resistance resistor between the high-resistance resistor and the thermistor;
    a switch comprising a bypass line bypassing the high-resistance resistor, the switch being actuatable to direct current from the voltage supply through the high-resistance resistor and low-resistance resistor for exhaust gas temperatures within a low temperature range and to direct current from the voltage supply around the high-resistance resistor via the bypass line for exhaust gas temperatures within a high temperature range;
    an analog-to-digital converter that converts a voltage divider output signal representative of a temperature of the exhaust gas, the voltage divider output signal comprising a difference between a reference voltage and at least a voltage lost due to a combined resistance of the thermistor, high-resistance resistor, and low-resistance resistor in the low temperature mode, and a difference between the reference voltage and at least a voltage lost due to a combined resistance of the thermistor and low-resistance resistor in the high temperature mode;
    an electronic control module configured to predict an exhaust gas temperature, wherein the electronic control module is operable to control the actuation of the switch based on the predicted exhaust gas temperature; and
    an on-board diagnostics controller communicable in electronic communication with the electronic control module, wherein the on-board diagnostics controller triggers a thermistor diagnostic fault for voltage divider output signal values within predetermined voltage divider output signal value upper and lower ranges.

9. The system of claim 8, wherein at least a portion of the voltage divider output signals for exhaust gas temperatures within the low temperature range are the same as at least a portion of the voltage divider output signals for exhaust gas temperatures within the high temperature range.

10. The system of claim 8, wherein the voltage divider output signal value associated with a lowest temperature of the low temperature range is substantially higher than a highest voltage divider output signal value of the voltage divider output signal value lower range, and wherein the voltage divider output signal value associated with a highest temperature of the high temperature range is substantially lower than a lowest voltage divider output signal value of the voltage divider output signal value upper range.

* * * * *